United States Patent [19]

Beach et al.

[11] Patent Number: 4,559,269

[45] Date of Patent: Dec. 17, 1985

[54] COMPOSITE PUFFED BORAX PARTICLES

[75] Inventors: Sidney C. Beach, Parma; Gary W. Loar, Strongsville, both of Ohio

[73] Assignee: McGean-Rohco, Inc., Cleveland, Ohio

[21] Appl. No.: 600,117

[22] Filed: Apr. 13, 1984

[51] Int. Cl.$^4$ .......................... B32B 9/04; B32B 19/04
[52] U.S. Cl. ..................................... 428/403; 428/697;
428/701; 428/704; 428/920; 428/921; 428/404;
427/215; 423/279; 252/378 R
[58] Field of Search ............... 428/403, 701, 704, 697,
428/920, 921; 252/378 R; 427/215

[56] References Cited

U.S. PATENT DOCUMENTS

| | | | |
|---|---|---|---|
| 3,454,357 | 7/1969 | Rhees et al. | 422/198 X |
| 3,944,651 | 3/1976 | D'Souza | 252/378 R |
| 4,243,728 | 1/1981 | Sato et al. | 428/403 X |
| 4,254,167 | 3/1981 | Sulzbacher et al. | 428/403 X |
| 4,309,480 | 1/1982 | Armanni | 428/403 |

*Primary Examiner*—P. C. Ives
*Attorney, Agent, or Firm*—Fay, Sharpe, Fagan, Minnich & McKee

[57] ABSTRACT

A composite particle is provided which comprises a matrix of puffed borax having a porous surface, with the matrix having retained on the porous surface thereof a plurality of individual grains of metal oxide. A method of producing such a composite particle is also provided.

10 Claims, No Drawings

COMPOSITE PUFFED BORAX PARTICLES

BACKGROUND OF THE INVENTION

The present invention relates a composite puffed borax particulate material and to a means for producing same. More particularly, the instant invention concerns a puffed borax material having on its surface particles or grains of a metallic oxide compound and to a means of producing such a material.

Sodium tetraborate ($Na_2B_4O_7.5H_2O$) is a free-flowing solid crystal containing five molecules of water per mole of borate. When the crystal is heated rapidly under controlled conditions, the water is vaporized in a process which causes the formation of a low density puffed particle characterized by a high degree of internal and external porosity. An apparatus and process for preparing such puffed borax, or a borax matrix, is described in U.S. Pat. No. 3,454,357. The density of the particles depends upon the manner in which borate is heated and may vary from 55 pounds per cubic foot to as low as about 2 pounds per cubic foot.

This material has a number of uses. Particularly, it is well known that this borax matrix can absorb organic solvents such as trichloroethylene. In many cases as much as 50% of a liquid may be adsorbed while still giving the appearance of a dry free-flowing solid. Solids, too, have been deposited on a puffed borax matrix. However, this has been accomplished by applying them to the borax matrix while the solid is in the molten state or by depositing them by evaporation from solution in the presence of puffed borax, the liquid phase being a solvent for the material to be loaded, but not for borax.

The present invention is based, at least in part, upon the discovery that certain metal powders, particularly refractory metal oxides, are readily adsorbed and retained on to the surface as well as within the interstices or pores of a puffed borax matrix. It is an object of this invention therefore to provide a particle comprising a matrix of puffed borax, with the matrix having on its surface and in its interstices thereof grains of a metal-oxygen compound.

Another object of this invention is to provide a particle as described above wherein the metal-oxygen compound is a metal oxide.

A further object is to provide a particle wherein the puffed borax matrix with adsorbed powder has a bulk density of between about 4 and about 65 pounds per cubic foot and the supporting borax matrix has a bulk density of from about 4 to about 30 pounds per cubic foot.

A still further object is to provide a particle whrein the puffed borax matrix comprises between about 10 to about 99% of the weight of the particle.

Additional objects of the invention are to provide a particle wherein the metal oxide compound is antimony oxide.

Another object is to provide a particle wherein the adsorbed powder has a grain size from about 0.1 to about 100 microns.

Another object of this invention is the provision of a process to prepare the loaded matrix particles described hereinbefore.

The low density puffed borax particles, where the interior supporting walls have become thin, are fragile and susceptible to breakdown by handling. When the metal oxides have filled these pores, however, it has been found that the friability of the puffed borax matrix is reduced. Moreover, the addition of puffed borax to an ordinarily dusty material, such as antimony oxide, produces a mass of greatly reduced dustiness.

The compositions of this invention find a number of industrial applications where both borax and oxides are parts of basic formulations. One such area is in the ceramic industry where metal oxides are used for pigmentation. Another very important application is in plastics and cellulosic products where fire retardancy and smoke suppression specifications must be achieved. These specifications generally require that antimony oxide be included in combination with a halogen-containing material to impart fire retardancy, and this property can be further enhanced, along with some degree of smoke suppression, if borates, phosphates, and certain metal oxides, such as zinc and molybdenum, are included.

Metal oxides are generally produced by calcination which, in most cases, results in very fine and dusty products. This property presents handling and health hazard problems which are greatly minimized by the use of this invention provided borax is also a desirable ingredient of the resultant formulation.

SUMMARY OF THE INVENTION

In one aspect, the present invention concerns a composite particle comprising a matrix of puffed borax having a porous surface, with the borax matrix having retained on the porous surface thereof a plurality of individual grains of a metal oxide.

In another aspect, the instant invention concerns a method of producing a plurality of composite particles with each particle including a porous matrix of puffed borax having on the surface thereof a plurality of individual grains of a metal oxide which method comprises providing a plurality of puffed borax particles, and mixing a plurality of metal oxide grains with the puffed borax particles without destroying the integrity of the borax grains.

THE PREFERRED EMBODIMENTS OF THE INVENTION

The composite material of this invention, that is, the loaded borax matrix, is readily prepared by gently agitating the puffed borax particles in the presence of the desired finely divided powdered, i.e., loading material. The agitation may be provided by placing the puffed borax and the loading material in a cylindrical vessel and rotating it on its longitudinal axis with that axis in a nearly horizontal position to provide a gentle rolling or tumbling action in the interior.

The puffed borax used should have a bulk density of less than about 30 pounds per cubic foot. For some applications, a lower bulk density of about 2 to 10 pounds per cubic foot is desirable. A preferred bulk density is in the order of 4 pounds per cubic foot with still lighter material having a bulk density in the order of 2 pounds per cubic foot being useful.

The mechanism by which the powder is adsorbed on the surface of the puffed borax particles is not understood, but such materials as aluminum hydroxide (AL-(OH)$_3$) and antimony oxychloride (SbOCl), and brominated aromatic organic compounds exhibit very little affinity for the puffed borax particles. On the other hand, the oxides of zinc, antimony, tin and lead are readily adsorbed and well retained. The powders which are absorbed have an average grain size of about 1 to 100 microns with the smaller sizes being preferred. However, powders with particles as large as 175 microns have been absorbed. In practice, more than one metal oxide may be utilized. That is, the puffed borax may be coated with a mixture of metal oxides.

Metal oxides which have been employed in the practice of the instant invention include zinc oxide, lead monoxide, cobalt oxide, cuprous and cupric oxide, titanium oxide, ferric oxide, molybdenum oxide, aluminum oxide, antimony oxide, lead oxide, chromium oxide and mixtures thereof.

The invention will be described with reference to the following examples which are present for the purposes of illustrating the practice of the invention and not limiting the scope thereof.

EXAMPLE I

Fifty (50) grams of puffed borax having an apparent bulk density of four pounds per cubic foot and a particle size of between eight mesh and thirty mesh were placed in a ceramic ball mill with no balls with fifty grams of antimony oxide having an average particle size of about one micron and rolled gently for twenty minutes. Two further portions of fifty grams each of antimony oxide were added and the procedure repeated. The dusty nature of the antimony oxide diminished rapidly and the apparent bulk density of the mixture increased. Although some traces of antimony oxide were evident on the wall of the ball mill, the loading otherwise appeared complete, showing that a particle could be produced in the form of a free-flowing ball with diameters ranging from about 1/16" to ⅛" that would comprise a ratio of about 75% oxide to 25% borax. Obviously, any desired lower ratio of oxide to borax could be achieved in the process.

Particles produced as described above were mixed with a polyethylene in the amount of 10% by weight along with 5% polyvinyl chloride as a halogen source which gave the polyethylene molding formed from the mixture a satisfactory degree of flame retardancy.

EXAMPLE II

Five grams of puffed borax having an apparent bulk density of four pounds per cubic foot and an approximate bead size of 48 mesh were placed in a jar with four grams of lead oxide ($Pb_3O_4$) having a particle size of minus 80 mesh and tumbled for ten minutes. Three additional 4-gram portions of lead oxide were added and the procedure repeated. The resulting product was orange, free-flowing roundish beads of puffed borax loaded with lead oxide. A loading factor of 80% was thus achieved. The dusty nature of the lead oxide diminished rapidly and the apparent bulk density of the mixture increased.

EXAMPLE III

A green particle resulted when five grams of puffed borax having an apparent bulk density of four pounds per cubic foot were placed in a jar with one gram of green chrome oxide ($Cr_2O_3$) having particle sizes of minus 80 mesh and rolled gently for twenty minutes. The dusty nature of the chrome oxide diminished rapidly and the apparent bulk density of the mixture increased. Four subsequent one-gram chrome oxide additions were then made giving a chrome oxide loading factor of 50%.

Similar results to Example III were obtained, with the particle color being as indicated, with zinc oxide (white), lead monoxide (yellow), cobalt oxide (black), cuprous (red) and cupric oxide (black), titanium dioxide (white), ferric oxide (red), molybdenum oxide (white) and aluminum oxide (white). Though loading maximums may vary, it is evident that about any metal oxide appears to have some degree of affinity for puffed borax. Properties of the products prepared with puffed borax of four pounds per cubic foot are shown in Table I.

TABLE I

BULK DENSITY OF LOADED BORAX BEADS

| OXIDE LOAD | WEIGHT RATIO OXIDE/PUFFED BORAX | BULK DENSITY - LBS/FT$^3$ | |
|---|---|---|---|
| | | LOADED BEADS | OXIDE ALONE |
| $Sb_2O_3$ | 0.69 | 7.7 | 44.6 |
| $Sb_2O_3$ | 1.44 | 11.1 | 44.6 |
| $Pb_3O_4$ | 3.37 | 23.6 | 120.1 |
| $Fe_2O_3$ | 0.22 | 7.4 | 32.8 |
| ZnO | 1.03 | 11.8 | 35.1 |
| $Cu_2O$ | 0.92 | 12.2 | 54.9 |

EXAMPLE IV

Antimony oxide was loaded on puffed borax of different bulk density according to the following steps:

1. Screen the puffed borax on an 80 mesh screen to remove fines.
2. Weigh retained puffed borax into 4 gram amount
3. Add 2 grams $Sb_2O_3$ (H grade) and tumble.
4. Screen tumbled, loaded puffed borax on 80 mesh to remove "unloaded" $Sb_2O_3$.
5. Weigh loaded puffed borax.
6. If $Sb_2O_3$ is loading, return to Step (3) and add more $Sb_2O_3$. If $Sb_2O_3$ is not loading, go to Step (7).
7. Find amount of $Sb_2O_3$ loaded by difference in weight between loaded and original (Step 2) puffed borax.

The above procedure was repeated for 28 lb/ft$^3$, 20 lb/ft$^3$, and 10 lb/ft$^3$ puffed borax and compared to earlier loading of 4 lb/ft$^3$ puffed borax. The resultant particles were white. The maximum loading ratios for the specified densities are listed in Table II.

TABLE II

| LOADING RATIOS | |
|---|---|
| PUFFED BORAX NOMINAL BULK DENSITY | MAXIMUM WEIGHT RATIO $Sb_2O_3$:PUFFED BORAX |
| 4 lbs/ft$^3$ | 7.2:1 |
| 10 lbs/ft$^3$ | 3.5:1 |
| 20 lbs/ft$^3$ | 2.0:1 |
| 28 lbs/ft$^3$ | 1.1:1 |

These data demonstrate the loading of the higher bulk density puffed borax, but it is noted that the maximum loading decreased with an increase in bulk density.

EXAMPLE V

The procedures of Example IV were repeated and the bulk density of the loaded product determined. Results are shown in Table III.

TABLE III

| LOADING RATIO AND LOADED DENSITY | | |
|---|---|---|
| PUFFED BORAX MEASURED BULK DENSITY | LOADING RATIO | LOADED PARTICLE BULK DENSITY |
| 11.1 lbs/ft$^3$ | 3.28 | 33.8 lbs/ft$^3$ |
| 31.8 lbs/ft$^3$ | 1.9 | 52.5 lbs/ft$^3$ |
| 44 lbs/ft$^3$ | 0.84 | 65 lbs/ft$^3$ |

In addition to the foregoing, puffed borax particles can be colored by coating them with various colorants. For example, puffed borax particles can be coated with inorganic as well as organic dyes or pigments. Specifically, separate batches of puffed borax particles were mixed with pigment blue 27, acid blue 80, prussian blue, ultramarine blue and carbon black particles, respectively, and rolled gently until the desired colored product was obtained. These so-coated puffed borax particles were blue (except for those coated with carbon black, which were black) and can be used as color producing agents in numerous materials.

Although the present invention has been described in conjunction with its preferred embodiments, it will be understood by those skilled in the art that modifications and variations may be resorted to without departing from the spirit and scope of the instant invention. Such modifications and variations are considered to be within the preview and scope of the present invention as defined in the appended claims.

We claim:

1. A composite particle comprising a matrix of puffed borax having a porous surface and a bulk density ranging from about 2 to about 44 pounds per cubic foot, with said matrix having directly adsorbed on the porous surface thereof a plurality of individual grains of a metal oxide.

2. The composite particle of claim 1 wherein said matrix comprises from about 10 to about 99 percent by weight of said composite particle with the remainder being at least one metal oxide.

3. The composite particle of claim 1 wherein the bulk density of said matrix ranges from about 4 to about 30 pounds per cubic foot.

4. The composite particle of claim 1 wherein said metal oxide is selected from the group consisting of zinc oxide, lead monoxide, cobalt oxide, cuprous and cupric oxide, titanium oxide, ferric oxide, molybdenum oxide, aluminum oxide, antimony oxide, lead oxide, chromium oxide and mixtures thereof.

5. The composite particle of claim 4 wherein the metal oxide is antimony oxide.

6. The composite article of claim 1 wherein the grains of metal oxide have a particle size ranging from about 0.1 to about 100 microns.

7. A composite particle comprising a matrix of puffed borax having a porous surface and a bulk density ranging from about 2 to about 44 pounds per cubic foot, with said matrix having directly adsorbed on the porous surface thereof a plurality of individual particles of at least one colorant, with said composite particle having been obtained by mixing puffed borax particles and colorant particles and subjecting them to a gentle rolling or tumbling action in the interior of a mixing vessel.

8. The composite particle of claim 7 wherein said colorant is selected from the group consisting of inorganic and organic dyes or pigments.

9. The composite particle of claim 8 wherein said organic dye is selected from the group consisting of pigment blue 27, acid blue 80, prussian blue and ultramarine blue.

10. The composite particle of claim 8 wherein said pigment is carbon black.

* * * * *